(12) United States Patent
Paolini, Jr. et al.

(10) Patent No.: US 11,175,561 B1
(45) Date of Patent: Nov. 16, 2021

(54) ELECTROPHORETIC DISPLAY MEDIA WITH NETWORK ELECTRODES AND METHODS OF MAKING AND USING THE SAME

(71) Applicant: E INK CORPORATION, Billerica, MA (US)

(72) Inventors: Richard J. Paolini, Jr., Framingham, MA (US); Jay William Anseth, Canton, MA (US)

(73) Assignee: E Ink Corporation, Billerica, MA (US)

( * ) Notice: Subject to any disclaimer, the term of this patent is extended or adjusted under 35 U.S.C. 154(b) by 138 days.

(21) Appl. No.: 16/382,381

(22) Filed: Apr. 12, 2019

Related U.S. Application Data

(60) Provisional application No. 62/656,660, filed on Apr. 12, 2018.

(51) Int. Cl.
   *G02B 26/00*    (2006.01)
   *G02F 1/167*    (2019.01)
   *G02F 1/1676*   (2019.01)
   *G02F 1/1675*   (2019.01)

(52) U.S. Cl.
   CPC ............ *G02F 1/167* (2013.01); *G02F 1/1676* (2019.01); *G02F 2001/1678* (2013.01)

(58) Field of Classification Search
   CPC . G02F 1/167; G02F 1/1676; G02F 2001/1678
   USPC ................ 359/245, 254, 290, 295, 296, 315
   See application file for complete search history.

(56) References Cited

U.S. PATENT DOCUMENTS

| | | | |
|---|---|---|---|
| 4,418,346 | A | 11/1983 | Batchelder |
| 5,872,552 | A | 2/1999 | Gordon, II |
| 5,930,026 | A | 7/1999 | Jacobson |
| 5,961,804 | A | 10/1999 | Jacobson |
| 6,017,584 | A | 1/2000 | Albert |
| 6,067,185 | A | 5/2000 | Albert |
| 6,120,588 | A | 9/2000 | Jacobson |
| 6,120,839 | A | 9/2000 | Comiskey |
| 6,124,851 | A | 9/2000 | Jacobson |

(Continued)

FOREIGN PATENT DOCUMENTS

| | | |
|---|---|---|
| WO | 1999067678 A2 | 12/1999 |
| WO | 2000005704 A1 | 2/2000 |
| WO | 2000038000 A1 | 6/2000 |

OTHER PUBLICATIONS

Kitamura, T. et al., "Electrical toner movement for electronic paper-like display", Asia Display/IDW '01, pp. 1517-1520, Paper HCS1-1 (2001). Jan. 1, 2001.

(Continued)

*Primary Examiner* — Mahidere S Sahle
(74) *Attorney, Agent, or Firm* — Brian D. Bean

(57) ABSTRACT

The present disclosure provides an electrophoretic display medium. The display medium can include a substrate, an electrophoretic layer, and a network electrode. The electrophoretic layer is disposed adjacent the top surface of the substrate. The electrophoretic layer includes a plurality of microcapsules containing an internal phase in a binder. A bottom portion of the plurality of microcapsules is embedded within the binder and a top portion of the microcapsules is emergent from the binder, thereby creating a network of valleys. The network electrode occupies at least a portion of the network of valleys.

17 Claims, 6 Drawing Sheets

(56) References Cited

U.S. PATENT DOCUMENTS

| | | |
|---|---|---|
| 6,130,773 A | 10/2000 | Jacobson |
| 6,130,774 A | 10/2000 | Albert |
| 6,144,361 A | 11/2000 | Gordon, II |
| 6,172,798 B1 | 1/2001 | Albert |
| 6,177,921 B1 | 1/2001 | Comiskey |
| 6,184,856 B1 | 2/2001 | Gordon, II |
| 6,225,971 B1 | 5/2001 | Gordon, II |
| 6,232,950 B1 | 5/2001 | Albert |
| 6,241,921 B1 | 6/2001 | Jacobson |
| 6,249,271 B1 | 6/2001 | Albert |
| 6,252,564 B1 | 6/2001 | Albert |
| 6,262,706 B1 | 7/2001 | Albert |
| 6,262,833 B1 | 7/2001 | Loxley |
| 6,271,823 B1 | 8/2001 | Gordon, II |
| 6,300,932 B1 | 10/2001 | Albert |
| 6,312,304 B1 | 11/2001 | Duthaler |
| 6,312,971 B1 | 11/2001 | Amundson |
| 6,323,989 B1 | 11/2001 | Jacobson |
| 6,327,072 B1 | 12/2001 | Comiskey |
| 6,376,828 B1 | 4/2002 | Comiskey |
| 6,377,387 B1 | 4/2002 | Duthaler |
| 6,392,785 B1 | 5/2002 | Albert |
| 6,392,786 B1 | 5/2002 | Albert |
| 6,413,790 B1 | 7/2002 | Duthaler |
| 6,422,687 B1 | 7/2002 | Jacobson |
| 6,445,374 B2 | 9/2002 | Albert |
| 6,459,418 B1 | 10/2002 | Comiskey |
| 6,480,182 B2 | 11/2002 | Turner |
| 6,498,114 B1 | 12/2002 | Amundson |
| 6,506,438 B2 | 1/2003 | Duthaler |
| 6,515,649 B1 | 2/2003 | Albert |
| 6,518,949 B2 | 2/2003 | Drzaic |
| 6,521,489 B2 | 2/2003 | Duthaler et al. |
| 6,535,197 B1 | 3/2003 | Comiskey |
| 6,538,801 B2 | 3/2003 | Jacobson |
| 6,545,291 B1 | 4/2003 | Amundson |
| 6,580,545 B2 | 6/2003 | Morrison |
| 6,639,578 B1 | 10/2003 | Comiskey |
| 6,652,075 B2 | 11/2003 | Jacobson |
| 6,657,772 B2 | 12/2003 | Loxley |
| 6,664,944 B1 | 12/2003 | Albert |
| D485,294 S | 1/2004 | Albert |
| 6,680,725 B1 | 1/2004 | Jacobson |
| 6,683,333 B2 | 1/2004 | Kazlas |
| 6,693,620 B1 | 2/2004 | Herb |
| 6,721,083 B2 | 4/2004 | Jacobson |
| 6,724,519 B1 | 4/2004 | Comiskey |
| 6,727,881 B1 | 4/2004 | Albert |
| 6,750,473 B2 | 6/2004 | Amundson |
| 6,816,147 B2 | 11/2004 | Albert |
| 6,819,471 B2 | 11/2004 | Amundson |
| 6,822,782 B2 | 11/2004 | Honeyman |
| 6,825,068 B2 | 11/2004 | Denis |
| 6,825,829 B1 | 11/2004 | Albert |
| 6,831,769 B2 | 12/2004 | Holman |
| 6,831,771 B2 | 12/2004 | Ho |
| 6,839,158 B2 | 1/2005 | Albert et al. |
| 6,842,167 B2 | 1/2005 | Albert |
| 6,842,279 B2 | 1/2005 | Amundson |
| 6,842,657 B1 | 1/2005 | Drzaic |
| 6,865,010 B2 | 3/2005 | Duthaler et al. |
| 6,866,760 B2 | 3/2005 | Paolini, Jr. |
| 6,870,661 B2 | 3/2005 | Pullen |
| 6,873,452 B2 | 3/2005 | Tseng |
| 6,909,532 B2 | 6/2005 | Chung |
| 6,914,713 B2 | 7/2005 | Chung |
| 6,922,276 B2 | 7/2005 | Zhang |
| 6,927,892 B2 | 8/2005 | Ho |
| 6,956,690 B2 | 10/2005 | Yu |
| 6,958,848 B2 | 10/2005 | Cao et al. |
| 6,958,849 B2 | 10/2005 | Chen |
| 6,967,640 B2 | 11/2005 | Albert et al. |
| 6,980,196 B1 | 12/2005 | Turner et al. |
| 6,982,178 B2 | 1/2006 | LeCain et al. |
| 6,987,603 B2 | 1/2006 | Paolini, Jr. |
| 7,002,728 B2 | 2/2006 | Pullen |
| 7,012,600 B2 | 3/2006 | Zehner |
| 7,012,735 B2 | 3/2006 | Honeyman |
| 7,030,412 B1 | 4/2006 | Drzaic et al. |
| 7,038,655 B2 | 5/2006 | Herb |
| 7,052,766 B2 | 5/2006 | Zang |
| 7,061,663 B2 | 6/2006 | Cao et al. |
| 7,071,913 B2 | 7/2006 | Albert |
| 7,072,095 B2 | 7/2006 | Liang |
| 7,075,502 B1 | 7/2006 | Drzaic |
| 7,075,703 B2 | 7/2006 | O'Neil et al. |
| 7,079,305 B2 | 7/2006 | Paolini, Jr. et al. |
| 7,106,296 B1 | 9/2006 | Jacobson |
| 7,109,968 B2 | 9/2006 | Albert et al. |
| 7,110,162 B2 | 9/2006 | Wu |
| 7,110,163 B2 | 9/2006 | Webber et al. |
| 7,110,164 B2 | 9/2006 | Paolini, Jr. et al. |
| 7,112,114 B2 | 9/2006 | Liang |
| 7,113,323 B2 | 9/2006 | Ho |
| 7,116,318 B2 | 10/2006 | Amundson |
| 7,119,772 B2 | 10/2006 | Amundson |
| 7,141,688 B2 | 11/2006 | Feng |
| 7,142,351 B2 | 11/2006 | Chung |
| 7,144,942 B2 | 12/2006 | Zang |
| 7,148,128 B2 | 12/2006 | Jacobson |
| 7,158,282 B2 | 1/2007 | Liang |
| 7,167,155 B1 | 1/2007 | Albert |
| 7,170,670 B2 | 1/2007 | Webber |
| 7,173,752 B2 | 2/2007 | Doshi et al. |
| 7,176,880 B2 | 2/2007 | Amundson et al. |
| 7,180,649 B2 | 2/2007 | Morrison |
| 7,184,197 B2 | 2/2007 | Liang |
| 7,190,008 B2 | 3/2007 | Amundson et al. |
| 7,202,991 B2 | 4/2007 | Zhang et al. |
| 7,206,119 B2 | 4/2007 | Honeyman et al. |
| 7,223,672 B2 | 5/2007 | Kazlas et al. |
| 7,226,550 B2 | 6/2007 | Hou |
| 7,230,750 B2 | 6/2007 | Whitesides |
| 7,230,751 B2 | 6/2007 | Whitesides |
| 7,236,290 B1 | 6/2007 | Zhang |
| 7,236,291 B2 | 6/2007 | Kaga et al. |
| 7,236,292 B2 | 6/2007 | LeCain |
| 7,242,513 B2 | 7/2007 | Albert et al. |
| 7,247,379 B2 | 7/2007 | Pullen |
| 7,256,766 B2 | 8/2007 | Albert et al. |
| 7,259,744 B2 | 8/2007 | Arango |
| 7,277,218 B2 | 10/2007 | Hwang |
| 7,280,094 B2 | 10/2007 | Albert |
| 7,286,279 B2 | 10/2007 | Yu |
| 7,301,693 B2 | 11/2007 | Chaug |
| 7,304,634 B2 | 12/2007 | Albert et al. |
| 7,304,780 B2 | 12/2007 | Liu |
| 7,312,784 B2 | 12/2007 | Baucom |
| 7,312,916 B2 | 12/2007 | Pullen |
| 7,321,459 B2 | 1/2008 | Masuda |
| 7,327,346 B2 | 2/2008 | Chung |
| 7,327,511 B2 | 2/2008 | Whitesides |
| 7,339,715 B2 | 3/2008 | Webber |
| 7,347,957 B2 | 3/2008 | Wu |
| 7,349,148 B2 | 3/2008 | Doshi et al. |
| 7,352,353 B2 | 4/2008 | Albert |
| 7,365,394 B2 | 4/2008 | Denis et al. |
| 7,365,733 B2 | 4/2008 | Duthaler |
| 7,375,875 B2 | 5/2008 | Whitesides |
| 7,382,363 B2 | 6/2008 | Albert et al. |
| 7,382,514 B2 | 6/2008 | Hsu |
| 7,388,572 B2 | 6/2008 | Duthaler et al. |
| 7,390,901 B2 | 6/2008 | Yang |
| 7,391,555 B2 | 6/2008 | Albert et al. |
| 7,401,758 B2 | 7/2008 | Liang |
| 7,411,719 B2 | 8/2008 | Paolini, Jr. |
| 7,411,720 B2 | 8/2008 | Honeyman et al. |
| 7,442,587 B2 | 10/2008 | Amundson et al. |
| 7,443,571 B2 | 10/2008 | LeCain et al. |
| 7,453,445 B2 | 11/2008 | Amundson |
| 7,473,782 B2 | 1/2009 | Yang |
| 7,477,444 B2 | 1/2009 | Cao et al. |
| 7,492,497 B2 | 2/2009 | Paolini, Jr. |
| 7,513,813 B2 | 4/2009 | Paolini, Jr. et al. |

(56) References Cited

U.S. PATENT DOCUMENTS

| | | |
|---|---|---|
| 7,532,388 B2 | 5/2009 | Whitesides et al. |
| 7,532,389 B2 | 5/2009 | Li |
| 7,535,624 B2 | 5/2009 | Amundson et al. |
| 7,551,346 B2 | 6/2009 | Fazel |
| 7,554,712 B2 | 6/2009 | Patry et al. |
| 7,560,004 B2 | 7/2009 | Pereira |
| 7,561,324 B2 | 7/2009 | Duthaler et al. |
| 7,572,394 B2 | 8/2009 | Gu |
| 7,576,904 B2 | 8/2009 | Chung |
| 7,580,180 B2 | 8/2009 | Ho |
| 7,583,427 B2 | 9/2009 | Danner |
| 7,598,173 B2 | 10/2009 | Ritenour |
| 7,605,799 B2 | 10/2009 | Amundson et al. |
| 7,636,191 B2 | 12/2009 | Duthaler |
| 7,649,666 B2 | 1/2010 | Isobe et al. |
| 7,649,674 B2 | 1/2010 | Danner |
| 7,667,886 B2 | 2/2010 | Danner |
| 7,672,040 B2 | 3/2010 | Sohn |
| 7,679,814 B2 | 3/2010 | Paolini, Jr. |
| 7,688,497 B2 | 3/2010 | Danner |
| 7,715,088 B2 | 5/2010 | Liang |
| 7,728,811 B2 | 6/2010 | Albert et al. |
| 7,729,039 B2 | 6/2010 | LeCain et al. |
| 7,733,335 B2 | 6/2010 | Zehner |
| 7,746,544 B2 | 6/2010 | Comiskey |
| 7,767,112 B2 | 8/2010 | Hou |
| 7,785,988 B2 | 8/2010 | Amundson |
| 7,791,782 B2 | 9/2010 | Paolini, Jr. |
| 7,826,129 B2 | 11/2010 | Wu |
| 7,830,592 B1 | 11/2010 | Sprague |
| 7,839,564 B2 | 11/2010 | Whitesides et al. |
| 7,843,621 B2 | 11/2010 | Danner et al. |
| 7,843,624 B2 | 11/2010 | Danner |
| 7,843,626 B2 | 11/2010 | Amundson et al. |
| 7,848,006 B2 | 12/2010 | Wilcox |
| 7,848,007 B2 | 12/2010 | Paolini, Jr. |
| 7,859,637 B2 | 12/2010 | Amundson et al. |
| 7,880,958 B2 | 2/2011 | Zang |
| 7,893,435 B2 | 2/2011 | Kazlas et al. |
| 7,898,717 B2 | 3/2011 | Patry, Jr. |
| 7,903,319 B2 | 3/2011 | Honeyman |
| 7,905,977 B2 | 3/2011 | Qi |
| 7,910,175 B2 | 3/2011 | Webber |
| 7,951,938 B2 | 5/2011 | Yang |
| 7,952,790 B2 | 5/2011 | Honeyman |
| 7,955,532 B2 | 6/2011 | Liang |
| 7,957,053 B2 | 6/2011 | Honeyman |
| 7,986,450 B2 | 7/2011 | Cao |
| 8,009,344 B2 | 8/2011 | Danner |
| 8,009,348 B2 | 8/2011 | Zehner |
| 8,018,640 B2 | 9/2011 | Whitesides |
| 8,027,081 B2 | 9/2011 | Danner |
| 8,034,209 B2 | 10/2011 | Danner |
| 8,035,886 B2 | 10/2011 | Jacobson |
| 8,049,947 B2 | 11/2011 | Danner |
| 8,068,272 B2 | 11/2011 | LeCain et al. |
| 8,072,675 B2 | 12/2011 | Lin |
| 8,077,141 B2 | 12/2011 | Duthaler |
| 8,077,381 B2 | 12/2011 | LeCain et al. |
| 8,089,453 B2 | 1/2012 | Comiskey |
| 8,115,729 B2 | 2/2012 | Danner |
| 8,120,836 B2 | 2/2012 | Lin |
| 8,129,655 B2 | 3/2012 | Jacobson et al. |
| 8,159,636 B2 | 4/2012 | Sun |
| 8,177,942 B2 | 5/2012 | Paolini, Jr. |
| 8,199,395 B2 | 6/2012 | Whitesides |
| 8,208,193 B2 | 6/2012 | Patry, Jr. |
| 8,237,892 B1 | 8/2012 | Sprague |
| 8,238,021 B2 | 8/2012 | Sprague |
| 8,257,614 B2 | 9/2012 | Gu |
| 8,270,064 B2 | 9/2012 | Feick |
| 8,305,341 B2 | 11/2012 | Arango |
| 8,361,620 B2 | 1/2013 | Zang |
| 8,362,488 B2 | 1/2013 | Chaug |
| 8,363,306 B2 | 1/2013 | Du |
| 8,373,211 B2 | 2/2013 | Amundson |
| 8,389,381 B2 | 3/2013 | Amundson |
| 8,390,301 B2 | 3/2013 | Danner |
| 8,390,918 B2 | 3/2013 | Wilcox |
| 8,395,836 B2 | 3/2013 | Lin |
| 8,437,069 B2 | 5/2013 | Lin |
| 8,441,414 B2 | 5/2013 | Lin |
| 8,446,664 B2 | 5/2013 | Chen |
| 8,456,589 B1 | 6/2013 | Sprague |
| 8,482,835 B2 | 7/2013 | LeCain |
| 8,498,042 B2 | 7/2013 | Danner |
| 8,514,168 B2 | 8/2013 | Chung |
| 8,547,628 B2 | 10/2013 | Wu |
| 8,576,162 B2 | 11/2013 | Kang |
| 8,582,196 B2 | 11/2013 | Walls |
| 8,593,718 B2 | 11/2013 | Comiskey |
| 8,610,988 B2 | 12/2013 | Zehner |
| 8,654,436 B1 | 2/2014 | Feick |
| 8,714,780 B2 | 5/2014 | Ho |
| 8,728,266 B2 | 5/2014 | Danner |
| 8,743,077 B1 | 6/2014 | Sprague |
| 8,754,859 B2 | 6/2014 | Gates |
| 8,773,398 B2 | 7/2014 | Funo et al. |
| 8,786,929 B2 | 7/2014 | LeCain |
| 8,797,258 B2 | 8/2014 | Sprague |
| 8,797,633 B1 | 8/2014 | Sprague |
| 8,797,636 B2 | 8/2014 | Yang |
| 8,830,553 B2 | 9/2014 | Patry, Jr. |
| 8,830,560 B2 | 9/2014 | Danner |
| 8,854,721 B2 | 10/2014 | Danner |
| 8,891,155 B2 | 11/2014 | Danner |
| 8,902,491 B2 | 12/2014 | Wang |
| 8,961,831 B2 | 2/2015 | Du |
| 8,969,886 B2 | 3/2015 | Amundson |
| 9,005,494 B2 | 4/2015 | Valianatos |
| 9,025,234 B2 | 5/2015 | Lin |
| 9,025,238 B2 | 5/2015 | Chan |
| 9,030,374 B2 | 5/2015 | Sprague |
| 9,052,564 B2 | 6/2015 | Sprague |
| 9,075,280 B2 | 7/2015 | Whitesides |
| 9,114,663 B2 | 8/2015 | Ho |
| 9,140,952 B2 | 9/2015 | Sprague |
| 9,147,364 B2 | 9/2015 | Wu |
| 9,152,003 B2 | 10/2015 | Danner |
| 9,152,004 B2 | 10/2015 | Paolini, Jr. |
| 9,158,174 B2 | 10/2015 | Walls |
| 9,201,279 B2 | 12/2015 | Wu |
| 9,223,164 B2 | 12/2015 | Lai |
| 9,238,340 B2 | 1/2016 | Kayal |
| 9,279,906 B2 | 3/2016 | Kang |
| 9,285,648 B2 | 3/2016 | Liu |
| 9,310,661 B2 | 4/2016 | Wu |
| 9,341,915 B2 | 5/2016 | Yang |
| 9,348,193 B2 | 5/2016 | Hiji |
| 9,361,836 B1 | 6/2016 | Telfer, Jr. |
| 9,366,935 B2 | 6/2016 | Du |
| 9,372,380 B2 | 6/2016 | Du |
| 9,382,427 B2 | 7/2016 | Du |
| 9,419,024 B2 | 8/2016 | Amundson |
| 9,423,666 B2 | 8/2016 | Wang |
| 9,428,649 B2 | 8/2016 | Li |
| 9,454,057 B2 | 9/2016 | Wu |
| 9,529,240 B2 | 12/2016 | Paolini, Jr. |
| 9,554,495 B2 | 1/2017 | Danner |
| 9,557,623 B2 | 1/2017 | Wang |
| 9,582,041 B2 | 2/2017 | Cheng |
| 9,620,066 B2 | 4/2017 | Bishop |
| 9,632,373 B2 | 4/2017 | Huang |
| 9,664,978 B2 | 5/2017 | Arango |
| 9,666,142 B2 | 5/2017 | Hung |
| 9,670,367 B2 | 6/2017 | Li |
| 9,671,635 B2 | 6/2017 | Paolini, Jr. |
| 9,688,859 B2 | 6/2017 | Yezek |
| 9,726,957 B2 | 8/2017 | Telfer |
| 9,733,540 B2 | 8/2017 | LeCain et al. |
| 9,778,500 B2 | 10/2017 | Gates |
| 9,778,537 B2 | 10/2017 | Wang |
| 9,835,926 B2 | 12/2017 | Sprague |
| 9,841,653 B2 | 12/2017 | Wu |

(56) References Cited

U.S. PATENT DOCUMENTS

| | | |
|---|---|---|
| 10,037,735 B2 | 7/2018 | Amundson |
| 10,048,563 B2 | 8/2018 | Paolini, Jr. |
| 10,048,564 B2 | 8/2018 | Paolini, Jr. |
| 10,190,743 B2 | 1/2019 | Hertel et al. |
| 2002/0060321 A1 | 5/2002 | Kazlas |
| 2003/0048522 A1 | 3/2003 | Liang |
| 2003/0151029 A1 | 8/2003 | Hsu |
| 2003/0164480 A1 | 9/2003 | Wu |
| 2003/0179438 A1* | 9/2003 | Yanagawa ............ G02B 26/026 359/296 |
| 2004/0030125 A1 | 2/2004 | Li |
| 2004/0085619 A1 | 5/2004 | Wu et al. |
| 2004/0105036 A1 | 6/2004 | Danner et al. |
| 2005/0012980 A1 | 1/2005 | Wilcox |
| 2005/0122306 A1 | 6/2005 | Wilcox et al. |
| 2005/0122563 A1 | 6/2005 | Honeyman et al. |
| 2005/0156340 A1 | 7/2005 | Valianatos et al. |
| 2006/0255322 A1 | 11/2006 | Wu |
| 2007/0052757 A1 | 3/2007 | Jacobson |
| 2007/0091417 A1 | 4/2007 | Cao et al. |
| 2007/0237962 A1 | 10/2007 | Liang |
| 2008/0130092 A1 | 6/2008 | Whitesides |
| 2009/0009852 A1 | 1/2009 | Honeyman |
| 2009/0122389 A1 | 5/2009 | Whitesides |
| 2009/0168067 A1 | 7/2009 | LeCain et al. |
| 2009/0206499 A1 | 8/2009 | Whitesides |
| 2009/0207477 A1* | 8/2009 | Komatsu ............ G02F 1/16757 359/296 |
| 2009/0225398 A1 | 9/2009 | Duthaler |
| 2009/0315044 A1 | 12/2009 | Amundson |
| 2010/0148385 A1 | 6/2010 | Balko |
| 2010/0177396 A1 | 7/2010 | Lin |
| 2011/0140744 A1 | 6/2011 | Kazlas |
| 2011/0164301 A1 | 7/2011 | Paolini, Jr. |
| 2011/0187683 A1 | 8/2011 | Wilcox |
| 2011/0193032 A1 | 8/2011 | Shi |
| 2011/0217639 A1 | 9/2011 | Sprague |
| 2011/0286081 A1 | 11/2011 | Jacobson |
| 2011/0292319 A1 | 12/2011 | Cole |
| 2012/0049125 A1 | 3/2012 | Du |
| 2013/0161565 A1 | 6/2013 | Laxton |
| 2013/0193385 A1 | 8/2013 | Li |
| 2013/0244149 A1 | 9/2013 | Wang |
| 2014/0011913 A1 | 1/2014 | Du |
| 2014/0078024 A1 | 3/2014 | Paolini |
| 2014/0078573 A1 | 3/2014 | Comiskey |
| 2014/0078576 A1 | 3/2014 | Sprague |
| 2014/0078857 A1 | 3/2014 | Nelson |
| 2014/0104674 A1 | 4/2014 | Ting |
| 2014/0192000 A1 | 7/2014 | Hung |
| 2014/0210701 A1 | 7/2014 | Wu |
| 2014/0231728 A1 | 8/2014 | Du |
| 2014/0347718 A1 | 11/2014 | Duthaler et al. |
| 2015/0005720 A1 | 1/2015 | Zang |
| 2015/0177590 A1 | 6/2015 | Laxton |
| 2015/0185509 A1 | 7/2015 | Wang |
| 2015/0241754 A1 | 8/2015 | Du |
| 2015/0246553 A1* | 9/2015 | Tamoto .................. G02F 1/167 347/199 |
| 2015/0261057 A1 | 9/2015 | Harris, Jr. |
| 2015/0277160 A1 | 10/2015 | Laxton |
| 2015/0301425 A1 | 10/2015 | Du |
| 2015/0318539 A1* | 11/2015 | Kelley .................. H01M 4/382 429/217 |
| 2015/0378235 A1 | 12/2015 | Lin |
| 2016/0012710 A1 | 1/2016 | Lu |
| 2016/0077375 A1 | 3/2016 | Lin |
| 2016/0103380 A1 | 4/2016 | Kayal et al. |
| 2016/0170106 A1 | 6/2016 | Wang et al. |

OTHER PUBLICATIONS

Yamaguchi, Y. et al., "Toner display using insulative particles charged triboelectrically", Asia Display/IDW '01, pp. 1729-1730, Paper AMD4-4 (2001). Jan. 1, 2001.

Mohl, M. et al., "Self-assembled large scale metal alloy grid patterns as flexible transparent conductive layers.", Sci. Rep. 5, 13710; doi: 10.1038/srep13710 (2015). Sep. 3, 2015.

* cited by examiner

ELECTROPHORETIC DISPLAY MEDIA WITH NETWORK ELECTRODES AND METHODS OF MAKING AND USING THE SAME

RELATED APPLICATIONS

This application claims priority to U.S. Provisional Patent Application No. 62/656,660, filed Apr. 12, 2019. All references, applications, and patents referred to herein are incorporated by reference in their entireties.

BACKGROUND

Electrophoretic displays can operate in a "shutter" mode, in which the electrophoretic display transitions between an "open" and a "closed" state, as opposed to transitioning between two colors, e.g., black and white. In some cases, these shutter mode displays include a grid electrode, or some other secondary structures amongst the electrophoretic layer that provides an electric field to drive lateral motions of the electrophoretic particles. In some instances, the grid electrodes are simply screens or wire mesh, however, screens and wire mesh do not have sufficient light transmission for many variable transmission designs, or the required voltages are beyond the capacities of the material. More sophisticated structures can be formed using electron-beam deposition or photolithography, however, such methods of fabricating grid electrodes are time-consuming and expensive. See, for example, Mohl et al., "Self-assembled large scale metal alloy network patterns as flexible transparent conductive layers," *Nature Scientific Reports*, DOI: 10.1038/srep13710. Such techniques require multiple printing, plating, and/or etching steps.

There is a need for processes and components for forming variable transmission electro-optic displays that are adapted for mass production and at a reduced cost.

SUMMARY

The invention provides an improved method for fabricating a shutter-mode electrophoretic display by taking advantage of the topology of a layer of encapsulated electro-optic media partially embedded in a binder to create a network electrode that can drive the electro-optic medium. In an aspect, the present disclosure provides an electrophoretic display medium including a substrate, an electrophoretic layer, and a network electrode. The network electrode is made of a conductive material, defined herein as having a volume resistivity of less than $1\times10^3$ Ohm-cm, for example, less than 1 Ohm-cm. The substrate includes a top surface. The electrophoretic layer is disposed adjacent to and contacting the top surface. The electrophoretic layer includes a plurality of microcapsules containing an internal phase in a binder. The internal phase includes a plurality of particles disposed in a fluid. The particles are capable of moving through the fluid upon application of an electric field. The electrophoretic layer is constructed such that a bottom portion of the plurality of microcapsules containing the internal phase are embedded within the binder and a top portion of the plurality of microcapsules of the internal phase is emergent from the binder. A network of valleys is formed between the top portions of the plurality of microcapsules of the internal phase. The network electrode occupies at least a portion of the network of valleys. In some embodiments, the network electrode occupies a volume that is the lowest portion of the network of valleys when a vector normal to the top surface is within 45° of pointing upward. For example, the substrate may be flexible or curved. In some embodiments, the internal phase is encapsulated in a collagen-containing coacervate, for example, a collagen-acacia coacervate.

In another aspect, the present disclosure provides a method for making an electrophoretic display medium, such as those described herein. The method includes: a) introducing a flowable electrode precursor into the network of valleys; and b) solidifying the flowable electrode precursor into the network electrode, thereby resulting in the network electrode occupying a volume that is the lowest portion of the network of valleys when a vector normal to the top surface is within 45° of pointing upward. Typically, the network electrode has a volume resistivity of less than $1\times10^3$ Ohm-cm, for example, less than 1 Ohm-cm.

In a further aspect, the present disclosure provides a method for making an electrophoretic display medium. The method includes: a) applying a flowable electrode precursor layer to a top surface of a substrate; b) embedding a plurality of microcapsules containing an internal phase within the flowable electrode precursor, thereby displacing at least a portion of the flowable electrode precursor layer and initiating contact between the plurality of microcapsules and the top surface of the substrate; and c) solidifying the flowable electrode precursor into a network electrode.

The foregoing and other aspects and advantages of the present disclosure will appear from the following description. In the description, reference is made to the accompanying drawings that form a part hereof, and in which there is shown by way of illustration a preferred embodiment. This embodiment does not necessarily represent the full scope of the invention, however, and reference is therefore made to the claims and herein for interpreting the scope of the invention.

DETAILED DESCRIPTION

Figure 1A:
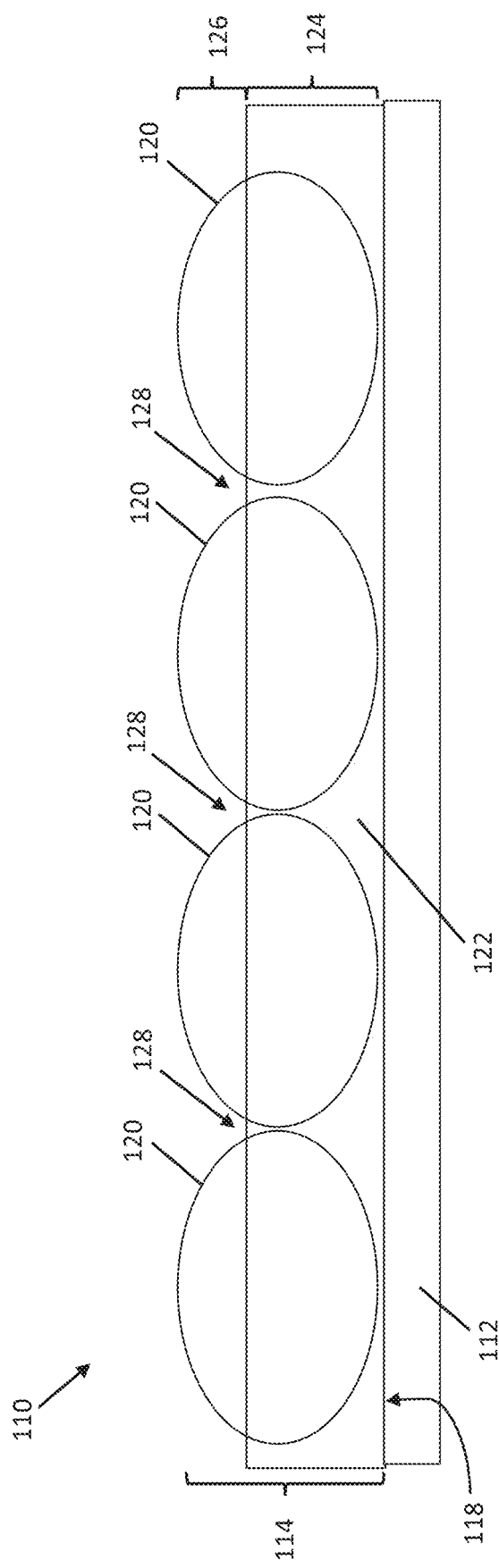
FIG. 1A is a schematic illustration of one non-limiting example of an electrophoretic display medium, also representing one step in a process, in accordance with one aspect of the present disclosure.

The present disclosure relates to processes and components for forming electro-optic displays. Electro-optic displays of the present disclosure include electrophoretic display media, generally characterized by the movement of particles through an applied electric field, are highly reflective, can be made bistable, and consume very little power. Such displays can have attributes of good brightness and contrast, wide viewing angles, state bistability, and low power consumption when compared with liquid crystal displays. Encapsulated electrophoretic displays also enable the display to be printed. These properties allow encapsulated electrophoretic display media to be used in many applications for which traditional electronic displays are not suitable, such as flexible displays. The electro-optical properties of encapsulated displays allow, and in some cases require, novel schemes or configurations to be used to address the displays.

The term "electro-optic", as applied to a material or a display, is used herein in its conventional meaning in the imaging art to refer to a material having first and second display states differing in at least one optical property, the material being changed from its first to its second display state by application of an electric field to the material. Although the optical property is typically color perceptible to the human eye, it may be another optical property, such as optical transmission, reflectance, luminescence, or, in the case of displays intended for machine reading, pseudo-color in the sense of a change in reflectance of electromagnetic wavelengths outside the visible range.

The term "gray state" is used herein in its conventional meaning in the imaging art to refer to a state intermediate two extreme optical states of a pixel, and does not necessarily imply a black-white transition between these two extreme states. For example, several of the E Ink patents and published applications referred to below describe electrophoretic displays in which the extreme states are white and deep blue, so that an intermediate "gray state" would actually be pale blue. Indeed, as already mentioned, the change in optical state may not be a color change at all. The terms "black" and "white" may be used hereinafter to refer to the two extreme optical states of a display, and should be understood as normally including extreme optical states which are not strictly black and white, for example the aforementioned white and dark blue states. The term "monochrome" may be used hereinafter to denote a drive scheme which only drives pixels to their two extreme optical states with no intervening gray states.

Some electro-optic materials are solid in the sense that the materials have solid external surfaces, although the materials may, and often do, have internal liquid- or gas-filled spaces. Such displays using solid electro-optic materials may hereinafter for convenience be referred to as "solid electro-optic displays". Thus, the term "solid electro-optic displays" includes rotating bichromal member displays, encapsulated electrophoretic displays, microcell electrophoretic displays and encapsulated liquid crystal displays.

The terms "bistable" and "bistability" are used herein in their conventional meaning in the art to refer to displays comprising display elements having first and second display states differing in at least one optical property, and such that after any given element has been driven, by means of an addressing pulse of finite duration, to assume either its first or second display state, after the addressing pulse has terminated, that state will persist for at least several times, for example at least four times, the minimum duration of the addressing pulse required to change the state of the display element. It is shown in U.S. Pat. No. 7,170,670 that some particle-based electrophoretic displays capable of gray scale are stable not only in their extreme black and white states but also in their intermediate gray states, and the same is true of some other types of electro-optic displays. This type of display is properly called "multi-stable" rather than bistable, although for convenience the term "bistable" may be used herein to cover both bistable and multi-stable displays.

One type of electro-optic display, which has been the subject of intense research and development for a number of years, is the particle-based electrophoretic display, in which a plurality of charged particles move through a fluid under the influence of an electric field. Electrophoretic displays can have attributes of good brightness and contrast, wide viewing angles, state bistability, and low power consumption when compared with liquid crystal displays. Nevertheless, problems with the long-term image quality of these displays have prevented their widespread usage. For example, particles that make up electrophoretic displays tend to settle, resulting in inadequate service-life for these displays.

As noted above, electrophoretic media require the presence of a fluid. In most prior art electrophoretic media, this fluid is a liquid, but electrophoretic media can be produced using gaseous fluids; see, for example, Kitamura, T., et al., "Electrical toner movement for electronic paper-like display", IDW Japan, 2001, Paper HCS1-1, and Yamaguchi, Y., et al., "Toner display using insulative particles charged triboelectrically", IDW Japan, 2001, Paper AMD4-4). See also U.S. Pat. Nos. 7,321,459 and 7,236,291. Such gas-based electrophoretic media appear to be susceptible to the same types of problems due to particle settling as liquid-based electrophoretic media, when the media are used in an orientation which permits such settling, for example in a sign where the medium is disposed in a vertical plane. Indeed, particle settling appears to be a more serious problem in gas-based electrophoretic media than in liquid-based ones, since the lower viscosity of gaseous suspending fluids as compared with liquid ones allows more rapid settling of the electrophoretic particles.

"Shutter mode" electrophoretic displays are configured so that the particles can switch between a largely light-blocking (or reflecting) state and a largely light-transmitting state. These displays often are constructed with particles which can migrate between a smaller and larger electrode. Migration of the particles to the large electrodes allows them to spread out, causing the capsule to take on the visual properties of the particles. Migration of the particles to the smaller electrode causes the capsule to take on the visual properties of the dispersing fluid or of the larger electrode, because the particles are "clumped" together near the smaller electrode. Another use of this effect is to control transmission of light through the capsule. The drawback to shutter mode displays is that the electrodes must be etched very precisely.

The term "electro-optic", as applied to a material or a display, is used herein in its conventional meaning in the imaging art to refer to a material having first and second display states differing in at least one optical property, the material being changed from its first to its second display state by application of an electric field to the material. Although the optical property is typically color perceptible to the human eye, it may be another optical property, such as optical transmission, reflectance, luminescence, or, in the case of displays intended for machine reading, pseudo-color in the sense of a change in reflectance of electromagnetic wavelengths outside the visible range.

Numerous patents and applications assigned to or in the names of the Massachusetts Institute of Technology (MIT), E Ink Corporation, E Ink California, LLC and related companies describe various technologies used in encapsulated and microcell electrophoretic and other electro-optic media. Encapsulated electrophoretic media comprise numerous small capsules, each of which itself comprises an internal phase containing electrophoretically-mobile particles in a fluid medium, and a capsule wall surrounding the internal phase. Typically, the capsules are themselves held within a polymeric binder to form a coherent layer positioned between two electrodes. In a microcell electrophoretic display, the charged particles and the fluid are not encapsulated within microcapsules but instead are retained within a plurality of cavities formed within a carrier medium, typically a polymeric film. The technologies described in these patents and applications include:

(a) Electrophoretic particles, fluids and fluid additives; see for example U.S. Pat. Nos. 5,961,804; 6,017,584; 6,120,588; 6,120,839; 6,262,706; 6,262,833; 6,300,932; 6,323,989; 6,377,387; 6,515,649; 6,538,801; 6,580,545; 6,652,075; 6,693,620; 6,721,083; 6,727,881; 6,822,782; 6,831,771; 6,870,661; 6,927,892; 6,956,690; 6,958,849; 7,002,728; 7,038,655; 7,052,766; 7,110,162; 7,113,323; 7,141,688; 7,142,351; 7,170,670; 7,180,649; 7,226,550; 7,230,750; 7,230,751; 7,236,290; 7,247,379; 7,277,218; 7,286,279; 7,312,916; 7,375,875; 7,382,514; 7,390,901; 7,411,720; 7,473,782; 7,532,388; 7,532,389; 7,572,394; 7,576,904; 7,580,180; 7,679,814; 7,746,544; 7,767,112; 7,848,006; 7,903,319; 7,951,938; 8,018,640; 8,115,729; 8,199,395; 8,257,614; 8,270,064; 8,305,341; 8,361,620; 8,363,306; 8,390,918; 8,582,196; 8,593,718; 8,654,436; 8,902,491; 8,961,831; 9,052,564; 9,114,663; 9,158,174; 9,341,915; 9,348,193; 9,361,836; 9,366,935; 9,372,380; 9,382,427; and 9,423,666; and U.S. Patent Applications Publication Nos. 2003/0048522; 2003/0151029; 2003/0164480; 2003/0169227; 2003/0197916; 2004/0030125; 2005/0012980; 2005/0136347; 2006/0132896; 2006/0281924; 2007/0268567; 2009/0009852; 2009/0206499; 2009/0225398; 2010/0148385; 2011/0217639; 2012/0049125; 2012/0112131; 2013/0161565; 2013/0193385; 2013/0244149; 2014/0011913; 2014/0078024; 2014/0078573; 2014/0078576; 2014/0078857; 2014/0104674; 2014/0231728; 2014/0339481; 2014/0347718; 2015/0015932; 2015/0177589; 2015/0177590; 2015/0185509; 2015/0218384; 2015/0241754; 2015/0248045; 2015/0301425; 2015/0378236; 201610139483; and 201610170106;

(b) Capsules, binders and encapsulation processes; see for example U.S. Pat. Nos. 5,930,026; 6,067,185; 6,130,774; 6,172,798; 6,249,271; 6,327,072; 6,392,785; 6,392,786; 6,459,418; 6,839,158; 6,866,760; 6,922,276; 6,958,848; 6,987,603; 7,061,663; 7,071,913; 7,079,305; 7,109,968; 7,110,164; 7,184,197; 7,202,991; 7,242,513; 7,304,634; 7,339,715; 7,391,555; 7,411,719; 7,477,444; 7,561,324; 7,848,007; 7,910,175; 7,952,790; 7,955,532; 8,035,886; 8,129,655; 8,446,664; and 9,005,494; and U.S. Patent Applications Publication Nos. 2005/0156340; 2007/0091417; 2008/0130092; 2009/0122389; and 2011/0286081;

(c) Microcell structures, wall materials, and methods of forming microcells; see for example U.S. Pat. Nos. 7,072,095; and 9,279,906;

(d) Methods for filling and sealing microcells; see for example U.S. Pat. Nos. 7,144,942; and 7,715,088;

(e) Films and sub-assemblies containing electro-optic materials; see for example U.S. Pat. Nos. 6,825,829; 6,982,178; 7,112,114; 7,158,282; 7,236,292; 7,443,571; 7,513,813; 7,561,324; 7,636,191; 7,649,666; 7,728,811; 7,729,039; 7,791,782; 7,839,564; 7,843,621; 7,843,624; 8,034,209; 8,068,272; 8,077,381; 8,177,942; 8,390,301; 8,482,835; 8,786,929; 8,830,553; 8,854,721; 9,075,280; and 9,238,340; and U.S. Patent Applications Publication Nos. 2007/0237962; 2009/0109519; 2009/0168067; 2011/0164301; 2014/0115884; and 2014/0340738;

(f) Backplanes, adhesive layers and other auxiliary layers and methods used in displays; see for example U.S. Pat. Nos. D485,294; 6,124,851; 6,130,773; 6,177,921; 6,232,950; 6,252,564; 6,312,304; 6,312,971; 6,376,828; 6,392,786; 6,413,790; 6,422,687; 6,445,374; 6,480,182; 6,498,114; 6,506,438; 6,518,949; 6,521,489; 6,535,197; 6,545,291; 6,639,578; 6,657,772; 6,664,944; 6,680,725; 6,683,333; 6,724,519; 6,750,473; 6,816,147; 6,819,471; 6,825,068; 6,831,769; 6,842,167; 6,842,279; 6,842,657; 6,865,010; 6,873,452; 6,909,532; 6,967,640; 6,980,196; 7,012,735; 7,030,412; 7,075,703; 7,106,296; 7,110,163; 7,116,318; 7,148,128; 7,167,155; 7,173,752; 7,176,880; 7,190,008; 7,206,119; 7,223,672; 7,230,751; 7,256,766; 7,259,744; 7,280,094; 7,301,693; 7,304,780; 7,327,511; 7,347,957; 7,349,148; 7,352,353; 7,365,394; 7,365,733; 7,382,363; 7,388,572; 7,401,758; 7,442,587; 7,492,497; 7,535,624; 7,551,346; 7,554,712; 7,583,427; 7,598,173; 7,605,799; 7,636,191; 7,649,674; 7,667,886; 7,672,040; 7,688,497; 7,733,335; 7,785,988; 7,830,592; 7,843,626; 7,859,637; 7,880,958; 7,893,435; 7,898,717; 7,905,977; 7,957,053; 7,986,450; 8,009,344; 8,027,081; 8,049,947; 8,072,675; 8,077,141; 8,089,453; 8,120,836; 8,159,636; 8,208,193; 8,237,892; 8,238,021; 8,362,488; 8,373,211; 8,389,381; 8,395,836; 8,437,069; 8,441,414; 8,456,589; 8,498,042; 8,514,168; 8,547,628; 8,576,162; 8,610,988; 8,714,780; 8,728,266; 8,743,077; 8,754,859; 8,797,258; 8,797,633; 8,797,636; 8,830,560; 8,891,155; 8,969,886; 9,147,364; 9,025,234; 9,025,238; 9,030,374; 9,140,952; 9,152,003; 9,152,004; 9,201,279; 9,223,164; 9,285,648; and 9,310,661; and U.S. Patent Applications Publication Nos. 2002/0060321; 2004/0008179; 2004/0085619; 2004/0105036; 2004/0112525; 2005/0122306; 2005/0122563; 2006/0215106; 2006/0255322; 2007/0052757; 2007/0097489; 2007/0109219; 2008/0061300; 2008/0149271; 2009/0122389; 2009/0315044; 2010/0177396; 2011/0140744; 2011/0187683; 2011/0187689; 2011/0292319; 2013/0250397; 2013/0278900; 2014/0078024; 2014/0139501; 2014/0192000; 2014/0210701; 2014/0300837; 2014/0368753; 2014/0376164; 2015/0171112; 2015/0205178; 2015/0226986; 2015/0227018; 2015/0228666; 2015/0261057; 2015/0356927; 2015/0378235; 2016/077375; 2016/0103380; and 2016/0187759; and International Application Publication No. WO 00/38000; European Patents Nos. 1,099,207 B1 and 1,145,072 B1;

(g) Color formation and color adjustment; see for example U.S. Pat. Nos. 7,075,502; and 7,839,564;

(h) Methods for driving displays; see for example U.S. Pat. Nos. 7,012,600; and 7,453,445;

(i) Applications of displays; see for example U.S. Pat. Nos. 7,312,784; and 8,009,348; and Non-electrophoretic displays, as described in U.S. Pat. No. 6,241,921; and U.S. Patent Application Publication No. 2015/0277160; and applications of encapsulation and microcell technology other than displays; see for example U.S. Patent Application Publications Nos. 2015/0005720 and 2016/0012710.

An encapsulated or microcell electrophoretic display typically does not suffer from the clustering and settling failure mode of traditional electrophoretic devices and provides further advantages, such as the ability to print or coat the display on a wide variety of flexible and rigid substrates. (Use of the word "printing" is intended to include all forms of printing and coating, including, but without limitation: pre-metered coatings such as patch die coating, slot or extrusion coating, slide or cascade coating, curtain coating; roll coating such as knife over roll coating, forward and reverse roll coating; gravure coating; dip coating; spray coating; meniscus coating; spin coating; brush coating; air knife coating; silk screen printing processes; electrostatic printing processes; thermal printing processes; ink jet printing processes; electrophoretic deposition; and other similar techniques.) Thus, the resulting display can be flexible. Further, because the display medium can be printed (using a variety of methods), the display itself can be made inexpensively.

The preferred process for preparing electrophoretic capsules described in the aforementioned E Ink and MIT patents and applications uses a gelatin/acacia coacervate as the encapsulation material, and the process for forming such gelatin/acacia capsules may be summarized as follows; see, for example, the aforementioned 2002/0180687, Paragraphs [0069] to [0074]. An internal phase is prepared containing one or more types of electrophoretic particles in a suspending fluid; typically, the internal phase comprises titanic and carbon black particles in an uncolored hydrocarbon suspending fluid. However, for variable transmission applications, the internal phase may comprise only a single type of charged particle, e.g., functionalized carbon black. Alternatively, the internal phase may include more than two types of particles, such as three, four, or more. The particles may be colored, i.e., not black and not white. Regardless, the internal phase is thoroughly stirred to ensure that it is homogeneous. Gelatin is dissolved in deionized water at a temperature of 40° C., and vigorously stirred. The internal phase, heated to the same temperature, is added dropwise to the stirred gelatin solution through a tube the outlet of which is below the surface of the stirred solution. The resultant mixture is held at 40° C. with continued vigorous stirring to produce a dispersion of droplets of the internal phase in a continuous gelatin-containing aqueous phase.

A solution of acacia in water at 40° C. is then added to the mixture, and the pH of the mixture is lowered to approximately 4.9 to cause formation of the gelatin/acacia coacervate, thereby forming capsules. The temperature of the resultant mixture is then lowered to 10° C. and an aqueous solution of glutaraldehyde (an agent for cross-linking the capsule walls) is added. The resultant mixture is then warmed to 25° C. and stirred vigorously for a further 12 hours. The capsules produced are separated from the liquid and washed by redispersion in water. The capsules are then separated by size by sieving or otherwise. Typically, the desired range of capsule diameters will be 30-50 µm, with an average of 40 µm.

Although electrophoretic media are often opaque (since, for example, in many electrophoretic media, the particles substantially block transmission of visible light through the display) and operate in a reflective mode, many electrophoretic displays can be made to operate in a so-called "shutter mode" in which one display state is substantially opaque and one is light-transmissive. See, for example, the aforementioned. U.S. Pat. Nos. 6,130,774 and 6,172,798, and 5,872,552; 6,144,361; 6,271,823; 6,225,971; and 6,184,856. Dielectrophoretic displays, which are similar to electrophoretic displays but rely upon variations in electric field strength, can operate in a similar mode; see U.S. Pat. No. 4,418,346.

An encapsulated electrophoretic display typically does not suffer from the clustering and settling failure mode of traditional electrophoretic devices and provides further advantages, such as the ability to print or coat the display on a wide variety of flexible and rigid substrates. (Use of the word "printing" is intended to include all forms of printing and coating, including, but without limitation: pre-metered coatings such as patch die coating, slot or extrusion coating, slide or cascade coating, curtain coating; roll coating such as knife over roll coating, forward and reverse roll coating; gravure coating; dip coating; spray coating; meniscus coating; spin coating; brush coating; air knife coating; silk screen printing processes; electrostatic printing processes; thermal printing processes; ink jet printing processes; electrophoretic deposition (See U.S. Pat. No. 7,339,715); and other similar techniques.) Thus, the resulting display can be flexible. Further, because the display medium can be printed (using a variety of methods), the display itself can be made inexpensively.

Other types of electro-optic media may also be used in the displays of the present invention.

An electrophoretic display normally comprises a layer of electrophoretic material and at least two other layers disposed on opposed sides of the electrophoretic material, one of these two layers being an electrode layer. In most such displays both the layers are electrode layers, and one or both of the electrode layers are patterned to define the pixels of the display. For example, one electrode layer may be patterned into elongate row electrodes and the other into elongate column electrodes running at right angles to the row electrodes, the pixels being defined by the intersections of the row and column electrodes. Alternatively, and more commonly, one electrode layer has the form of a single continuous electrode and the other electrode layer is patterned into a matrix of pixel electrodes, each of which defines one pixel of the display. In another type of electrophoretic display, which is intended for use with a stylus, print head or similar movable electrode separate from the display, only one of the layers adjacent the electrophoretic layer comprises an electrode, the layer on the opposed side of the electrophoretic layer typically being a protective layer intended to prevent the movable electrode damaging the electrophoretic layer.

The manufacture of a three-layer electrophoretic display normally involves at least one lamination operation. For example, in several of the aforementioned MIT and E Ink patents and applications, there is described a process for manufacturing an encapsulated electrophoretic display in which an encapsulated electrophoretic medium comprising capsules in a binder is coated on to a flexible substrate comprising indium-tin-oxide (ITO) or a similar conductive coating (which acts as an one electrode of the final display) on a plastic film, the capsules/binder coating being dried to form a coherent layer of the electrophoretic medium firmly adhered to the substrate. Separately, a backplane, containing an array of pixel electrodes and an appropriate arrangement of conductors to connect the pixel electrodes to drive circuitry, is prepared. To form the final display, the substrate having the capsule/binder layer thereon is laminated to the backplane using a lamination adhesive. (A very similar process can be used to prepare an electrophoretic display usable with a stylus or similar movable electrode by replacing the backplane with a simple protective layer, such as a plastic film, over which the stylus or other movable electrode can slide.) In one preferred form of such a process, the backplane is itself flexible and is prepared by printing the pixel electrodes and conductors on a plastic film or other flexible substrate. The obvious lamination technique for mass production of displays by this process is roll lamination using a lamination adhesive.

An electro-optic display normally comprises a layer of electro-optic material and at least two other layers disposed on opposed sides of the electro-optic material, one of these two layers being an electrode layer. In most such displays both the layers are electrode layers, and one or both of the electrode layers are patterned to define the pixels of the display. For example, one electrode layer may be patterned into elongate row electrodes and the other into elongate column electrodes running at right angles to the row electrodes, the pixels being defined by the intersections of the row and column electrodes. Alternatively, and more commonly, one electrode layer has the form of a single continuous electrode and the other electrode layer is patterned into a matrix of pixel electrodes, each of which defines one pixel of the display. In another type of electro-optic display, which is intended for use with a stylus, print head or similar movable electrode separate from the display, only one of the layers adjacent the electro-optic layer comprises an electrode, the layer on the opposed side of the electro-optic layer typically being a protective layer intended to prevent the movable electrode damaging the electro-optic layer.

As already noted, an encapsulated electrophoretic medium typically comprises electrophoretic capsules disposed in a polymeric binder, which serves to form the discrete capsules into a coherent layer. The continuous phase in a polymer-dispersed electrophoretic medium, and the cell walls of a microcell medium serve similar functions. It has been found by E Ink researchers that the specific material used as the binder in an electrophoretic medium can affect the electro-optic properties of the medium. Among the electro-optic properties of an electrophoretic medium affected by the choice of binder is the so-called "dwell time dependence". As discussed in the aforementioned U.S. Pat. No. 7,119,772 (see especially FIG. 34 and the related description). It has been found that, at least in some cases, the impulse necessary for a transition between two specific optical states of a bistable electrophoretic display varies with the residence time of a pixel in its initial optical state, and this phenomenon is referred to as "dwell time dependence" or "DTD". Obviously, it is desirable to keep DTD as small as possible since DTD affects the difficulty of driving the display and may affect the quality of the image produced; for example, DTD may cause pixels which are supposed to form an area of uniform gray color to differ slightly from one another in gray level, and the human eye is very sensitive to such variations. Although it has been known that the choice of binder affects DTD, choosing an appropriate binder for any specific electrophoretic medium has hitherto been based on trial-and-error, with essentially no understanding of the relationship between DTD and the chemical nature of the binder.

The present disclosure provides methods and components for forming electrophoretic displays that are adapted for mass production and reduced manufacturing cost. In particular, the present disclosure provides methods and components for forming self-assembled network electrodes that automatically distribute themselves to create ring-shaped or annular electrodes around microcapsules in an electrophoretic device. Self-assembled network electrodes offer several benefits for electrophoretic devices. For example, a network electrode can be a way to cause lateral motion of the pigment without using a high frequency AC switching waveform. This results in large savings in power consumption. Self-assembled network electrodes also facilitate the manufacturing process by reducing the number of manufacturing steps, such as plating and etching.

In an aspect, the present disclosure provides an electrophoretic display medium. The electrophoretic display medium can be prepared in the manner described in the description of FIGS. 1A-1C or the description of FIGS. 2A-2B. Differences between the resulting electrophoretic display medium prepared in the manner described in the description of FIGS. 1A-1C and that prepared in the manner described in the description of FIGS. 2A-2B should be apparent to those having ordinary skill in the art.

For the ease of explanation, the following description will be made with reference to FIG. 1C, unless otherwise indicated, though like numbers represent like parts (and numbers sharing the last two digits, e.g., 110 and 210, represent like parts). Referring to FIG. 1C, the electrophoretic display medium 110 can include a substrate 112, an electrophoretic layer 114, and a network electrode 116. The substrate 112 can have a top surface 118. The electrophoretic layer 114 can be disposed adjacent to and contacting the top surface 118. The electrophoretic layer includes a plurality of microcapsules containing an internal phase 120 in a binder 122. The internal phase includes a plurality of particles disposed in a fluid (not illustrated, but described in sufficient detail in the references discussed above). The internal phase may contain only one type of particle that switches between a scattering and transparent state, i.e., shutter mode. The internal phase may include two different types of electrophoretic particles with different charge polarities and colors, e.g., black and white. The internal phase may include more than two types of electrophoretic particles and may include non-white and non-black colors.

As known in the field of electrophoretic displays, the particles are capable of moving through the fluid upon application of an electric field. The electrophoretic layer 114 is constructed such that a bottom portion 124 of the plurality of microcapsules of the internal phase is embedded within the binder 122 and a top portion 126 of the plurality of microcapsules 120 of the internal phase 120 is emergent from the binder. Referring to FIG. 1A, this construction causes a network of valleys 128 positioned between the top portions 126 of the plurality of microcapsules of the internal phase. This network of valleys can be bounded on the bottom by the binder. The network electrode 116 occupies at least a portion of the network of valleys 128. The network electrode 116 occupies a volume that is the lowest portion of the network of valleys 128 when a vector normal to the top surface 118 is within 45° of pointing upward. In other words, when the substrate is pointing generally in an upward direction, the network electrode 116 occupies the volume that a fluid would occupy under the force of gravity. In some cases, the network electrode 116 occupies a volume that is the lowest portion of the network of valleys 128 when a vector normal to the top surface 118 is within 40°, 35°, 30°, 25°, 20°, 15°, 10°, 5°, 2.5° or 0.1° of pointing upward or when the vector is pointing substantially upward.

The substrate 112 can take a variety of forms. It should be appreciated that the substrate is broadly defined here, so if a sacrificial layer is placed between a given layer that might on its own be a substrate (e.g., a thin layer of PET) and the electrophoretic layer, then the substrate 112 would consist of the given layer and the sacrificial layer. For clarity, the substrate can consist of any number of layers of any number of different materials and is intended to be broadly construed absent further specific description.

In some cases, the substrate 112 can include an electrode, such as the electrodes described in the references discussed above. In some cases, the substrate 112 can be substantially transparent to visible light. The substrate 112 can be a polymer film, such as a polyethylene terephthalate (PET) film. The substrate can be an indium tin oxide (ITO) film. In some cases, the substrate is a PET/ITO film. The substrate may include other suitable conductive materials such as PEDOT.

Figure 1B:
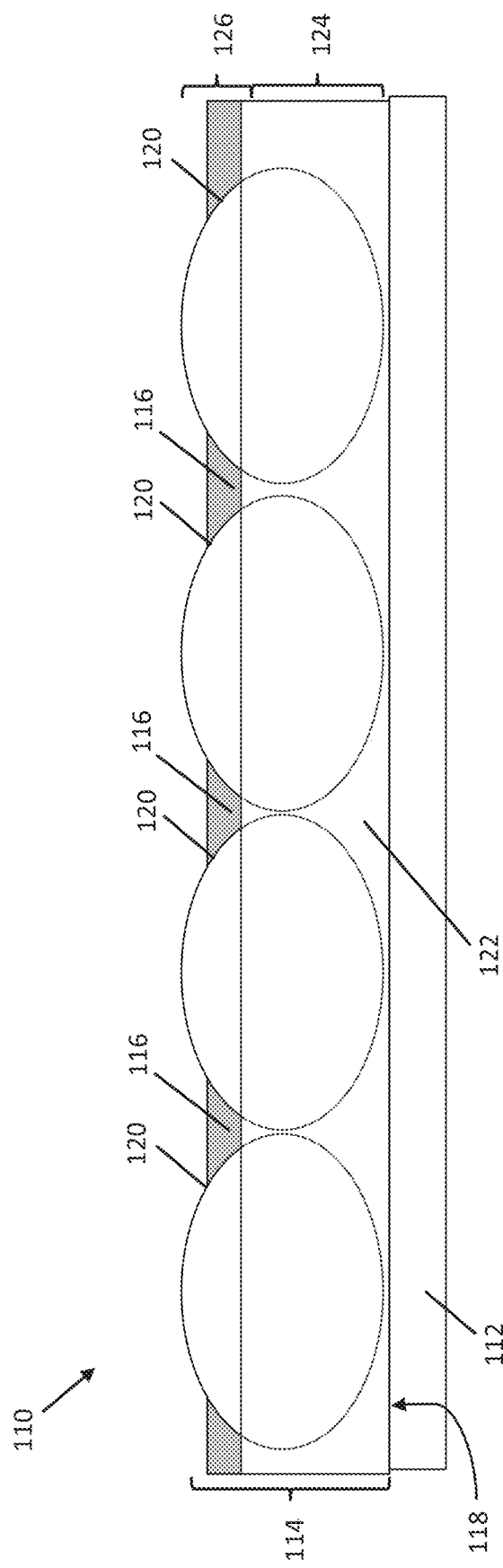
FIG. 1B is a schematic illustration of one non-limiting example of an electrophoretic display medium, also representing one step in a process, in accordance with one aspect of the present disclosure.
Figure 1C:
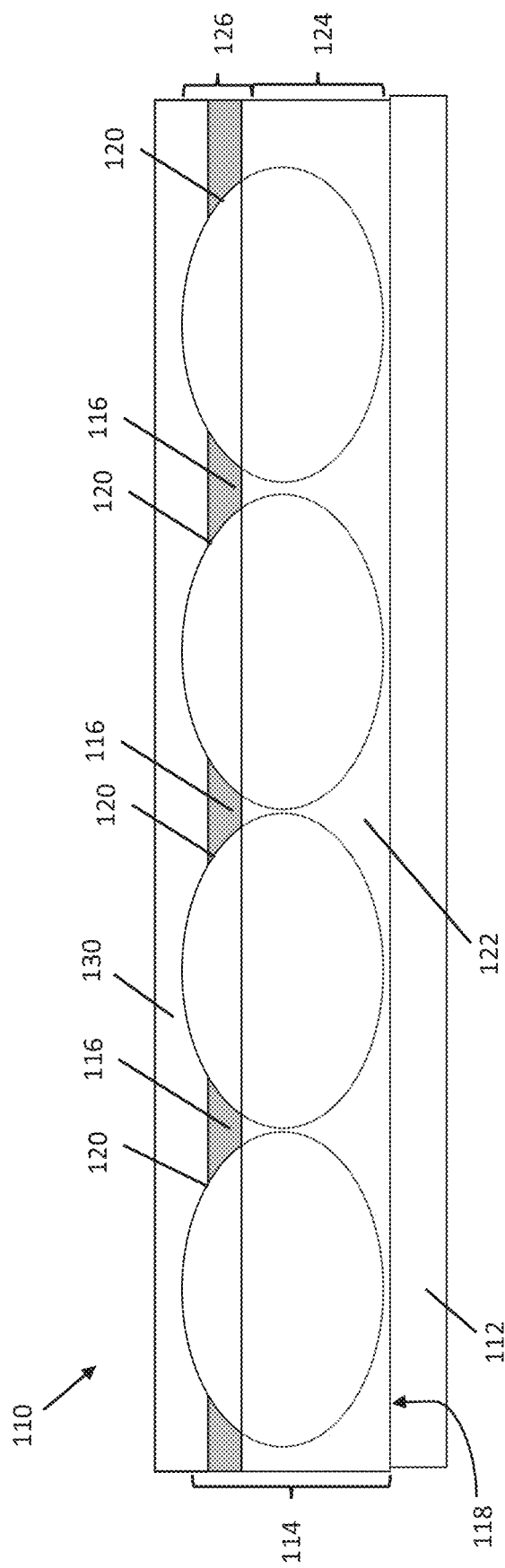
FIG. 1C is a schematic illustration of one non-limiting example of an electrophoretic display medium, also representing one step in a process, in accordance with one aspect of the present disclosure.

In some cases, such as some versions of the electrophoretic display medium 110 described with respect to FIGS. 1A-1C, the substrate 112 remains a part of the electrophoretic display medium 110. In some cases, such as some versions of the electrophoretic display medium 210 described with respect to FIGS. 2A-2B, the substrate 212 can be removed prior to usage of the electrophoretic display medium. In some cases, a substrate can be added to the electrophoretic display medium after the network electrode is formed, in order to facilitate the functionalities described herein for the electrophoretic display medium. For clarity, the term substrate can refer both to a substrate that is intended to be in a finished product and a sacrificial substrate that will be excluded from a finished product. For example, the substrate may be a release sheet.

The network electrode 116 can generally have properties suitable for use in a shutter mode device, as described above with respect to relevant references. The network electrode 116 can have a thickness of at least 1 μm, at least 5 μm, at least 10 μm, at least 15 μm, at least 20 μm, or at least 25 μm. The network electrode can have a thickness of at most 250 μm, at most 200 μm, at most 150 μm, at most 100 μm, at most 75 μm, at most 50 μm, or at most 25 μm.

The network electrode 116 can be composed of any suitable conductive material, e.g., a conductive metal with a low melting point. The conductive metal can be selected from the group consisting of gold, copper, silver, platinum, palladium, aluminum, iron, nickel, tin, lead, titanium, and combinations thereof. Alternatively, flakes, whiskers, dust, filings, etc. of any of these metals can be including in a matrix of immobilizing material, for example a polymer, for example a UV-curable polymer. The network electrode 116 can have additional or different conductive particles embedded within the matrix of the network electrode. For example, the conductive particles can include carbon nanotubes, carbon nanoparticles, graphene, or a combination thereof.

The network electrode 116 can substantially encircle each of the plurality of microcapsules of the internal phase when viewed from the side of the top portion of the plurality of microcapsules. It should be appreciated that an electrophoretic display medium with the network electrode failing to substantially encircle one or more microcapsules can still meet this limitation, so long as a plurality of microcapsules are encircled.

The electrophoretic display medium 110 can also include a dielectric layer (not illustrated) that is positioned to prevent the network electrode from contacting the substrate in the event that a small imperfection in the electrophoretic layer allows the network electrode precursor (see below) to flow into the imperfection to contact the substrate. The dielectric layer can be disposed between the substrate and the electrophoretic layer. This dielectric layer can be particularly useful in the method described below with respect to FIGS. 1A-1C, where the force of gravity is likelier to cause the network electrode precursor to contact the substrate.

The electrophoretic display medium 110 can also include a mechanical protection layer 130. After formation of the network electrode 116, the top portion 126 of the plurality of microcapsules 120 can still be emergent from the electrophoretic layer/network electrode and can be subject to damage, as shown in FIG. 1B. To mitigate this potential damage, a mechanical protection layer 130 can be disposed adjacent to and contacting the top portion 126 of the plurality of microcapsules 120 and the network electrode 116. This mechanical protection layer 130 can also function as a planarizing layer. The mechanical protection layer 130 can be a cured polymer hardcoat.

In certain aspects, the binder 122 can encompass at least 10% of the surface area of the plurality of microcapsules 120, including but not limited to, at least 20%, at least 30%, at least 40%, at least 50%, at least 60%, at least 70%, or at least 80% of the surface area.

The electrophoretic display medium 110 can include an adhesive layer that is formed on any surface of the medium 110, which allows the medium 110 to be affixed to a desired surface.

Referring to FIGS. 1A-1C, the present disclosure also provides a method of making an electrophoretic display medium 110. FIG. 1A shows one potential starting material for the method, having the components described elsewhere. The method includes: a) introducing a flowable electrode precursor into the network of valleys 128; and b) solidifying the flowable electrode precursor into a network electrode 116. The resulting network electrode 116 occupies a volume that is the lowest portion of the network of valleys 128 when a vector normal to the top surface 118 of the substrate 112 is within 45° of pointing upward. FIG. 1B shows the state of the electrophoretic display medium following steps a) and b). Replacing the network electrode 116 with the network electrode precursor in FIG. 1B represents the state of the electrophoretic display medium 110 between steps a) and b) (i.e., the network electrode precursor occupies roughly the space/volume occupied by the network electrode in the resulting electrophoretic display medium).

The method can further include, subsequent to step b), applying a mechanical protection layer atop the electrophoretic layer 114 and the network electrode 118. This step in the method is illustrated by the transition from FIG. 1B to FIG. 1C.

The network electrode precursor can take the form of a slurry, a flowable solid particle composition, or a combination thereof. In some cases, the network electrode precursor is a slurry that can include a plurality of particles of a conductive electrode material and a solvent. The solvent can be selected from the group consisting of water, acetone, methanol, ethanol, isopropanol, toluene, and combinations thereof. In some cases, the solvent can be at least 90%, at least 95%, at least 99%, at least 99.9%, or at least 99.99% water. In some cases, the network electrode precursor is a solid particle composition comprising a plurality of particles of a conductive electrode material. The conductive electrode material can be any of the materials described above with respect to the network electrode 116.

The introducing of step a) can include applying the flowable electrode precursor in a substantially uniform distribution to the top of the electrophoretic layer and waiting a length of time for gravity to settle the flowable electrode precursor into the network of valleys. The introducing of step a) can include applying the flowable electrode precursor to a given location and waiting a length of time for gravity to settle the flowable electrode precursor into the network of valleys.

The solidifying of step b) can include curing the flowable electrode precursor, evaporating solvent from the flowable electrode precursor, or a combination thereof. Curing can be radiation curing.

Figure 2A:
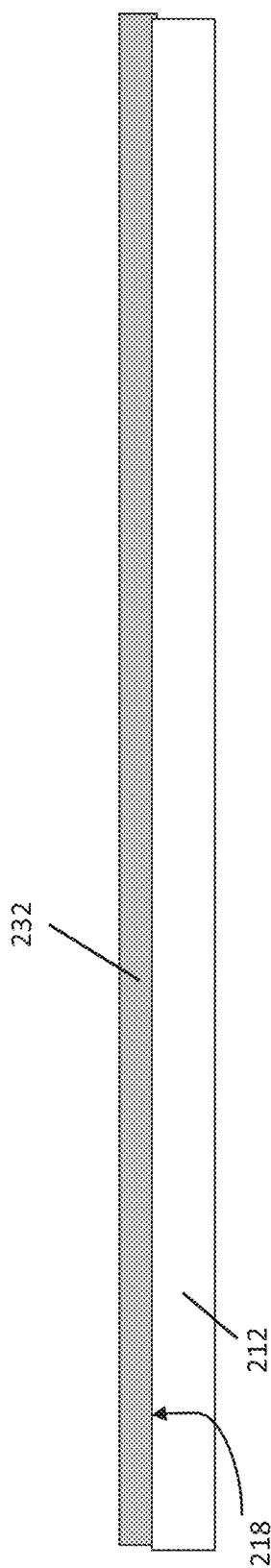
FIG. 2A is a schematic illustration of one non-limiting example of one step in a process, in accordance with one aspect of the present disclosure.
Figure 2B:
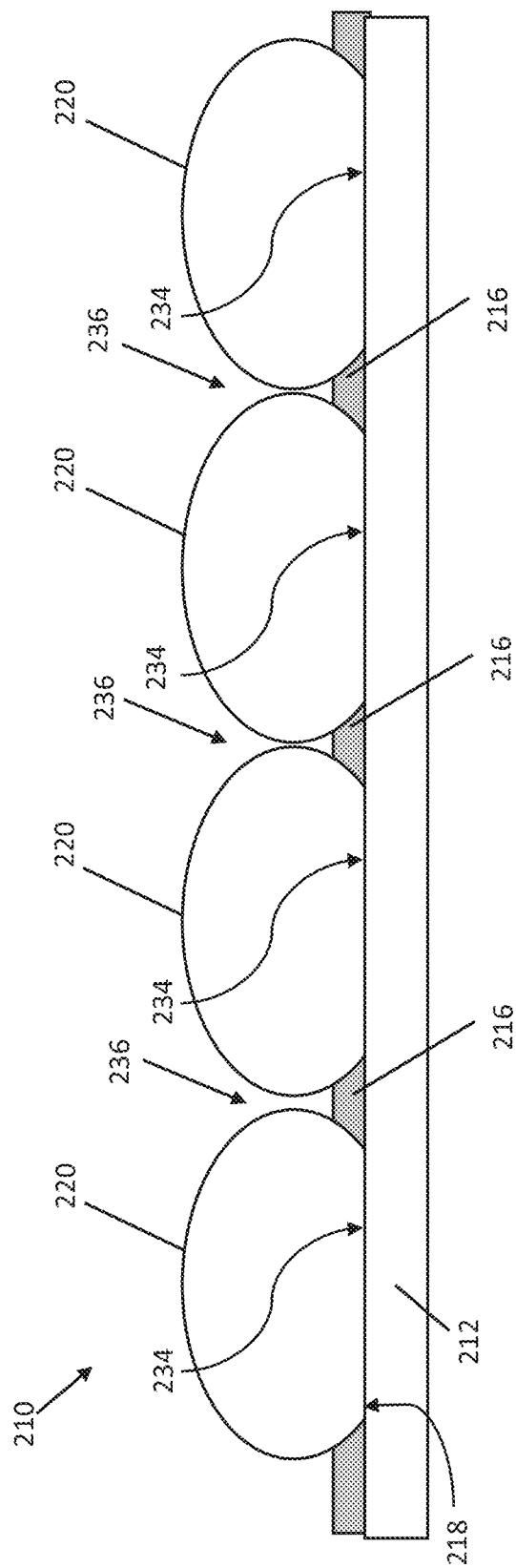
FIG. 2B is a schematic illustration of one non-limiting example of an electrophoretic display medium, also representing one step in a process, in accordance with one aspect of the present disclosure.

Referring to FIGS. 2A-2B, the present disclosure provides a method for making an electrophoretic display medium 210. The method includes: a) applying a layer of a flowable electrode precursor 232 to a top surface 218 of a substrate 212; b) embedding a plurality of microcapsules containing an internal phase 220 within the layers of the flowable electrode precursor 232, thereby displacing at least a portion of the flowable electrode precursor 232 and initiating contact between the plurality of microcapsules 220 and the top surface 218 of the substrate 212; and solidifying the flowable electrode precursor 232 into a network electrode 216.

FIG. 2A represents the method after step a). FIG. 2B represents the method after step c). Replacing the network electrode 216 with the network electrode precursor 232 in FIG. 2B represents the state of the electrophoretic display medium 210 between steps b) and c).

In some cases, the method can further include a step that is performed subsequent to step b) and prior to step c), the step including applying a pressure between the plurality of microcapsules of the internal phase 220 and the substrate 212 in order to provide a flat contact surface 234 of the plurality of microcapsules 220 contacting the top surface 218 of the substrate 212, thereby excluding the flowable electrode precursor 232 from between the plurality of microcapsules 220 and the top surface 218 where the flat contact surface 234 contacts the top surface 218. For some microcapsules of the internal phase 220, particularly those that are more flexible, the force of gravity might be sufficient to cause formation of the flat contact surface 234.

In some cases, the method can further include applying a binder to spaces 236 between the plurality of microcapsules 220 to a first side of the network electrode 216 that is opposite the top surface 218 of the substrate 212. In these cases, the method can also further include forming an electrode adjacent to a second side of the binder and the plurality of microcapsules that is opposite the top surface 218 of the substrate 212. The method can further include removing the substrate 212. Subsequent to removing the substrate, the plurality of microcapsules 220 can retake their original shape, thereby eliminating the flat contact surface(s) 234. In these situations, the same mechanical damage concerns arise, as discussed above, so the method can further include applying a mechanical protection layer to a surface of the electrophoretic display medium 210 from which the substrate 212 was remove.

The solidifying of step c) can include any of the methods of solidifying described above. The flowable electrode precursor 232 can be the same as that described above.

Figure 3B:
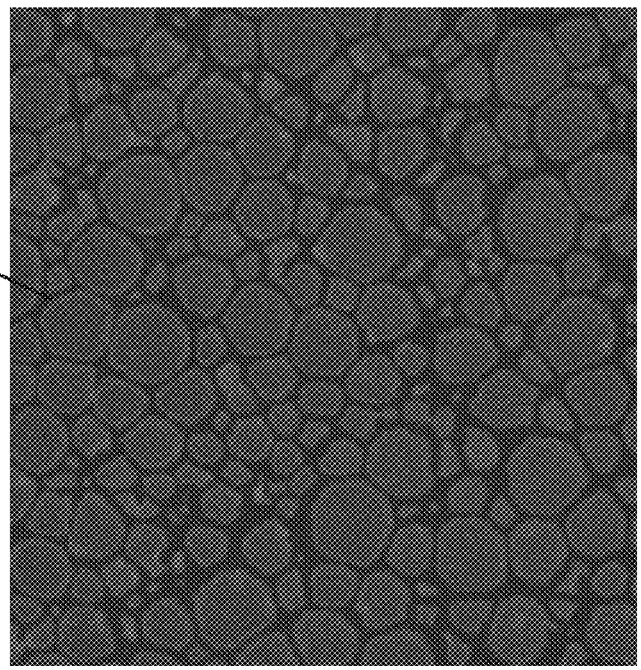
FIG. 3B is a top view of an electrophoretic display medium in accordance with one aspect of the present disclosure.
Figure 3A:
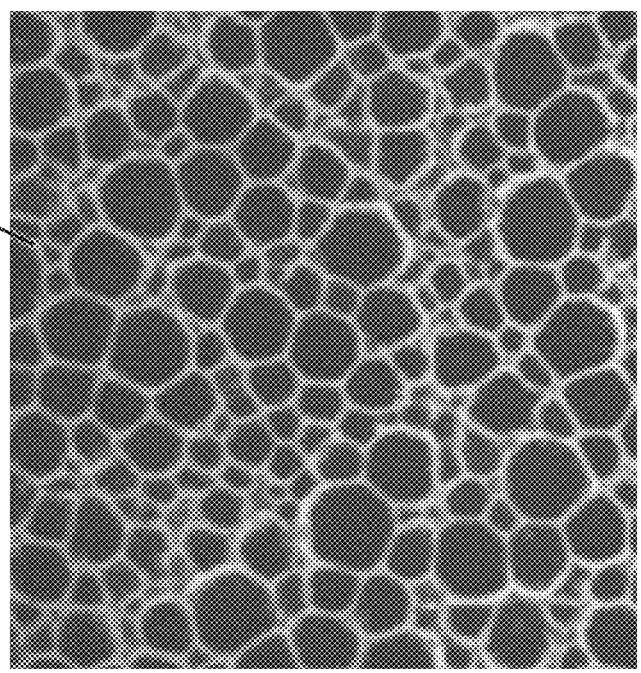
FIG. 3A is a top view of an electrophoretic display medium in accordance with one aspect of the present disclosure.

FIGS. 3A-3B show non-limiting examples of a top view (taken from the vantage point of the top of the sheet of FIGS. 1A-1C) of an electrophoretic display medium according to one aspect of the present disclosure. FIG. 3A shows the network of valleys 128 in white. FIG. 3B shows the network electrode 116 in black.

The present disclosure provides an inexpensive way to create aligned network electrodes. The network electrodes make a DC switching mode for shutter mode inks and make an improvement to the power consumption of each switch for a shutter mode device.

The present disclosure has described one or more preferred embodiments, and it should be appreciated that many equivalents, alternatives, variations, and modifications, aside from those expressly stated, are possible and within the scope of the invention.

The invention claimed is:

1. An electrophoretic display comprising:
a substrate having a top surface and comprising an electrode;
an electrophoretic layer disposed adjacent to and contacting the top surface, the electrophoretic layer comprising a plurality of microcapsules containing an internal phase, the plurality of microcapsules being bound together by in a continuous polymeric binder,
the internal phase comprising a plurality of particles disposed in a fluid, the particles being capable of moving through the fluid upon application of an electric field,
the electrophoretic layer being constructed such that a bottom portion of the plurality of microcapsules of the internal phase is embedded within the continuous polymeric binder and a top portion of the plurality of microcapsules of the internal phase is emergent from the continuous polymeric binder, thereby providing a network of valleys positioned between the top portion of the plurality of microcapsules of the internal phase;
a dielectric layer disposed between the substrate electrode and the electrophoretic layer; and
a network electrode formed from a flowable electrode precursor and occupying at least a portion of the network of valleys, the network electrode comprising a material having a volume resistivity smaller than $1 \times 10^3$ Ohm-cm.

2. The electrophoretic display of claim 1, wherein the substrate is substantially transparent to visible light.

3. The electrophoretic display of any one of claim 1, wherein the network electrode has a thickness of between 1 micrometer and 250 micrometers.

4. The electrophoretic display of claim 1, wherein the network electrode comprises a conductive metal selected from the group consisting of gold, copper, silver, platinum, palladium, aluminum, iron, nickel, tin, lead, titanium, and combinations thereof.

5. The electrophoretic display of claim 1, wherein the network electrode substantially encircles each of the plurality of microcapsules of the internal phase when viewing the electrophoretic display medium from a direction that places the electrophoretic layer between a viewer and the substrate.

6. The electrophoretic display of claim 1, wherein the network electrode comprises a plurality of conductive particles.

7. The electrophoretic display of claim 6, wherein the plurality of conductive particles comprise metal flakes, metal whiskers, carbon nanotubes, carbon nanoparticles, graphene, or combinations thereof.

8. The electrophoretic display of claim 1, wherein the microcapsules of the internal phase are encapsulated in a collagen-containing coacervate.

9. A method for making an electrophoretic display medium, the electrophoretic display medium including a substrate having a top surface, comprising an electrode, and having an electrophoretic layer disposed adjacent to and contacting the top surface,
the electrophoretic layer comprising a plurality of microcapsules containing an internal phase, the plurality of microcapsules being bound together by a continuous polymeric binder,
the internal phase comprising a plurality of particles disposed in a fluid, the particles being capable of moving through the fluid upon application of an electric field,
the electrophoretic layer being constructed such that a bottom portion of the plurality of microcapsules of the internal phase is embedded within the binder and a top portion of the plurality of microcapsules of the internal phase is emergent from the continuous polymeric binder, thereby providing a network of valleys positioned between the top portion of the plurality of microcapsules of the internal phase, and a dielectric layer disposed between the substrate electrode and the electrophoretic layer, the method comprising:
a) introducing a flowable electrode precursor into the network of valleys; and
b) solidifying the flowable electrode precursor into a network electrode, thereby resulting in the network electrode having a volume resistivity of less than $1\times10^3$ Ohm-cm.

10. The method of claim 9, wherein the flowable electrode precursor is a slurry, a flowable solid particle composition, or a combination thereof.

11. The method of claim 9, wherein the slurry includes a solvent selected from the group consisting of water, acetone, methanol, ethanol, isopropanol, toluene, and combinations thereof.

12. The method of claim 11, wherein the solvent is at least 90% water.

13. The method of any one of claim 9, wherein the conductive electrode material is selected from the group consisting of gold, copper, silver, platinum, palladium, aluminum, iron, nickel, tin, lead, titanium, and combinations thereof.

14. The method of claim 9, wherein the introducing of step a) comprises applying the flowable electrode precursor in a substantially uniform distribution to the top of the electrophoretic layer and waiting a length of time for gravity to settle the flowable electrode precursor into the network of valleys.

15. The method of claim 9, wherein the solidifying of step b) comprises curing the flowable electrode precursor, evaporating solvent from the flowable electrode precursor, or a combination thereof.

16. The method of claim 15, wherein curing comprises radiation curing.

17. The method of any one of claim 9, the method further comprising, subsequent to the solidifying of step b), applying a mechanical protection layer atop the electrophoretic layer and the network electrode.

* * * * *